United States Patent
Jennings

(10) Patent No.: US 7,848,019 B2
(45) Date of Patent: Dec. 7, 2010

(54) MICROSCOPE CALIBRATION APPARATUS AND METHOD AND STAGE INCLUDING CALIBRATION APPARATUS

(75) Inventor: Robert Jennings, Andover, MA (US)

(73) Assignee: Cytyc Corporation, Marlborough, MA (US)

( * ) Notice: Subject to any disclaimer, the term of this patent is extended or adjusted under 35 U.S.C. 154(b) by 331 days.

(21) Appl. No.: 11/953,598

(22) Filed: Dec. 10, 2007

(65) Prior Publication Data

US 2009/0147355 A1 Jun. 11, 2009

(51) Int. Cl.
*G02B 21/34* (2006.01)

(52) U.S. Cl. .................. 359/397; 359/391; 359/396

(58) Field of Classification Search ................ 359/391, 359/396, 397
See application file for complete search history.

(56) References Cited

U.S. PATENT DOCUMENTS

| 5,367,401 | A | | 11/1994 | Saulietis |
| 5,499,097 | A | * | 3/1996 | Ortyn et al. ................. 356/615 |
| 2006/0028716 | A1 | * | 2/2006 | Gilbert ........................ 359/368 |
| 2007/0139638 | A1 | | 6/2007 | Wolpert et al. |

FOREIGN PATENT DOCUMENTS

| DE | 19736470 A1 | 3/1999 |
| EP | 1703273 A1 | 9/2006 |
| GB | 2411249 | 8/2005 |
| WO | 9900689 | 1/1999 |
| WO | 9942885 | 8/1999 |

OTHER PUBLICATIONS

PCT International Search Report and Written Opinion for PCT/US2008/082411 from the International Searching Authority, Applicant Cytyc Corporation, Forms PCT/ISA/210, 220 and 237, dated Jan. 29, 2009 (16 pages).
"How to Measure MTF and Other Properties of Lenses", copyright Optikos Corporation, Cambridge, MA, Jul. 16, 1999, (64 pages).
Corporate Information, Carl Zeiss AG, Web Page, "Foucault's Knife Edge Test," http://www.zeiss.cz/C12567A100537AB9/ContentsFrame/FD94B02CA79E19BAC12569CF004ABFAD, accessed on Dec. 10, 2007 (1 page).

* cited by examiner

*Primary Examiner*—Joshua L Pritchett
(74) *Attorney, Agent, or Firm*—Vista IP Law Group LLP

(57) ABSTRACT

A stage for supporting a specimen slide and for calibrating a microscope includes a base and a calibration component integral with the base. The calibration component includes at least one calibration element for positional calibration and at least one calibration element for optical calibration. Calibration of the microscope can be performed without the need for independent calibration slides. The calibration component may be a glass calibration component or may be defined by a calibration element formed or etched through the base.

22 Claims, 14 Drawing Sheets

MICROSCOPE CALIBRATION APPARATUS AND METHOD AND STAGE INCLUDING CALIBRATION APPARATUS

FIELD OF THE INVENTION

The present inventions relate to devices for calibrating microscopes, and more particularly, to devices and methods for performing positional and optical calibration of a microscope.

BACKGROUND

Cytology is a branch of biology involving the study of the formation, structure, and function of cells. As applied in a laboratory setting, cytologists, cytotechnologists, and other medical professionals make medical diagnoses of a patient's condition based on visual examination of a specimen of the patient's cells. A typical cytological technique is a "Pap smear" test, which involves scraping cells from a woman's cervix and analyzing the cells in order to detect the presence of abnormal cells, a precursor to the onset of cervical cancer. Cytological techniques are also used to detect abnormal cells and disease in other parts of the human body.

Cytological techniques are widely employed because collection of cell samples for analysis is generally less invasive than traditional surgical pathological procedures such as biopsies. Biopsies typically involve excising tissue specimens from the patient using specialized biopsy needles having spring loaded translatable stylets, fixed cannulae, and the like. With cytological techniques, on the other hand, cell samples may be obtained from the patient by a variety of techniques including, for example, by scraping or swabbing an area, or by using a needle to aspirate body fluids from the chest cavity, bladder, spinal canal, or other appropriate area. Cell samples are often placed in solution and subsequently collected and transferred to a glass slide for viewing under magnification. Fixative and staining solutions are typically applied to the cells on the glass slide, often called a cell smear, for facilitating examination and for preserving the specimen for archival purposes.

Machine vision devices, such as automated imaging and reviewing microscopes, have been utilized to acquire images of cell samples and to analyze the samples. Microscopes, including microscopes that are part of integrated imaging and review systems, require periodic calibration. Calibration procedures include positional calibration, which involves confirming that the actual position of a microscope stage and/or microscope slide is the position as indicated by the system, and optical calibration, which involves confirming that optical parameters are as indicated by the system.

In the past, calibration has been performed using an independent microscope slide that includes calibration components. During use, the calibration slide is placed into position on the microscope stage, calibration is performed, and the custom microscope slide is removed. The same calibration slide may be used to calibrate other microscopes.

Another known calibration system is described in U.S. Pat. No. 5,367,401 to Saulietis. Saulietis describes factory calibration of a microscope that involves mounting a stage having multiple slide slots on a motor assembly and using a motor assembly to place calibration targets in line with a viewing window. The position reading for each target and known distance data provide stage reference coordinates. Using a calibration slide in each slide slot, a target reference point on the calibration slide is aligned with a viewing window, and its coordinates are read to provide an absolute position relative to stage coordinates determined by the stage's target references during factory calibration. The absolute reference coordinate position for each calibration slide can then be stored with an associated serial number. With this technique, an end user is not required to perform any calibration of individual slide slots, but enters a serial number and relies on stored data.

Known calibration devices and techniques, however, can be improved. Various known devices, e.g., as described by Saulietis, still use specialized calibration slides and may only be capable of positional calibration (x, y, z, θ). Specialized calibration slides can be lost, damaged or destroyed. Individual calibration slides may also involve time consuming and inconvenient calibration procedures, which may be required at frequent calibration intervals. Additionally, calibration slides may suffer from degraded optical performance due to the environment, e.g., dust, dirt, grease, etc. Special calibration slides may also vary from one slide to another. For example, different calibration slides may have different thicknesses. These variations must be accounted for during calibration.

SUMMARY

According to one embodiment, a stage for supporting a specimen slide includes a base having a bottom surface and a top surface configured for carrying the specimen slide and a calibration component integral with the base. The calibration component includes a first calibration element configured for performing positional calibration of the microscope and a second calibration element configured for performing optical calibration of the microscope.

According to another embodiment, a stage for supporting a specimen slide includes a base having a bottom surface and a top surface and a calibration component. The base is configured to support a single slide, and the calibration component is integral with the base. The calibration component includes a first calibration element that defines a first field of view. The first calibration element is configured for performing positional calibration of the microscope without the use of an independent calibration slide. The calibration component also includes a second calibration element that defines a second field of view. The second calibration element is configured for performing optical calibration of the microscope without the use of an independent calibration slide.

A further embodiment is directed to a method of calibrating a microscope. The method includes determining positional calibration information from a calibration component integral with a stage of the microscope, determining optical calibration information from the calibration component and calibrating the microscope based on the positional and optical calibration information.

Another embodiment is directed to an apparatus for performing positional and optical calibration of a microscope. The apparatus includes a calibration component that is integral with a stage of a microscope. The calibration component includes a first calibration element configured for performing positional calibration of the microscope and a second configured for performing optical calibration of the microscope.

In one or more embodiments, the calibration component is attached or affixed to a base of a microscope stage, and may be a glass calibration component that is positioned within a cavity defined by the base. The calibration component may also include an element that is formed or etched through the base. In one or more embodiments, the calibration component is configured for performing positional calibration and optical calibration of the microscope without use of an independent calibration slide. For example, a calibration component can include a plurality of calibration elements that define a plurality of fields of view. A first field of view includes a fiducial mark for performing positional calibration and a second field of view is clear and used for performing optical calibration (e.g., based on the intensity of light, uniformity of light or modular transfer function). The calibration component may be configured to include a central calibration element that defines a clear central field of view for performing optical calibration, and fields of view arranged around the central field of view, at least one of which includes a fiducial mark for performing positional calibration. With embodiments, microscope calibration can be performed without an independent calibration slide.

Other and further aspects of embodiments are described herein and will become apparent upon review of the following detailed description and drawings.

BRIEF DESCRIPTION OF THE DRAWINGS

Referring now to the drawings in which like reference numbers represent corresponding parts throughout and in which.

DETAILED DESCRIPTION OF ILLUSTRATED EMBODIMENTS

Embodiments relate to a calibration apparatus, microscope stage and calibration method that may be used for performing positional calibration and optical calibration of a microscope without having to use specialized calibration slides. Embodiments advantageously eliminate the need for specialized calibration slides by integrating a calibration component or target within or on a microscope stage.

In the following description, reference is made to the accompanying drawings which form a part hereof, and which show by way of illustration specific embodiments and how they may be practiced. It is to be understood that changes may be made without departing from the scope of embodiments.

Figure 1:
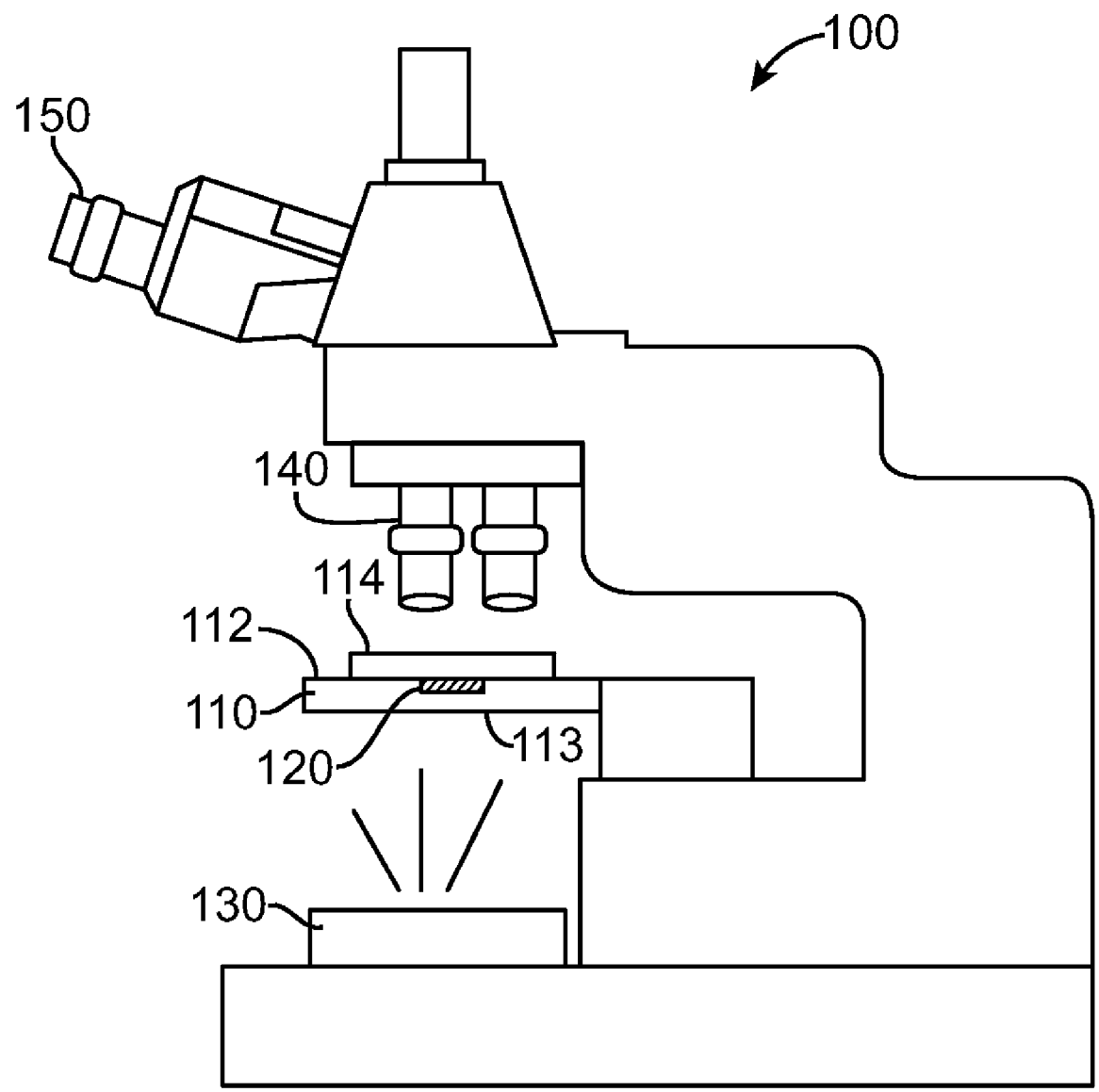
FIG. 1 is a side view of a microscope having a stage including an calibration component according to one embodiment.
Figure 2:
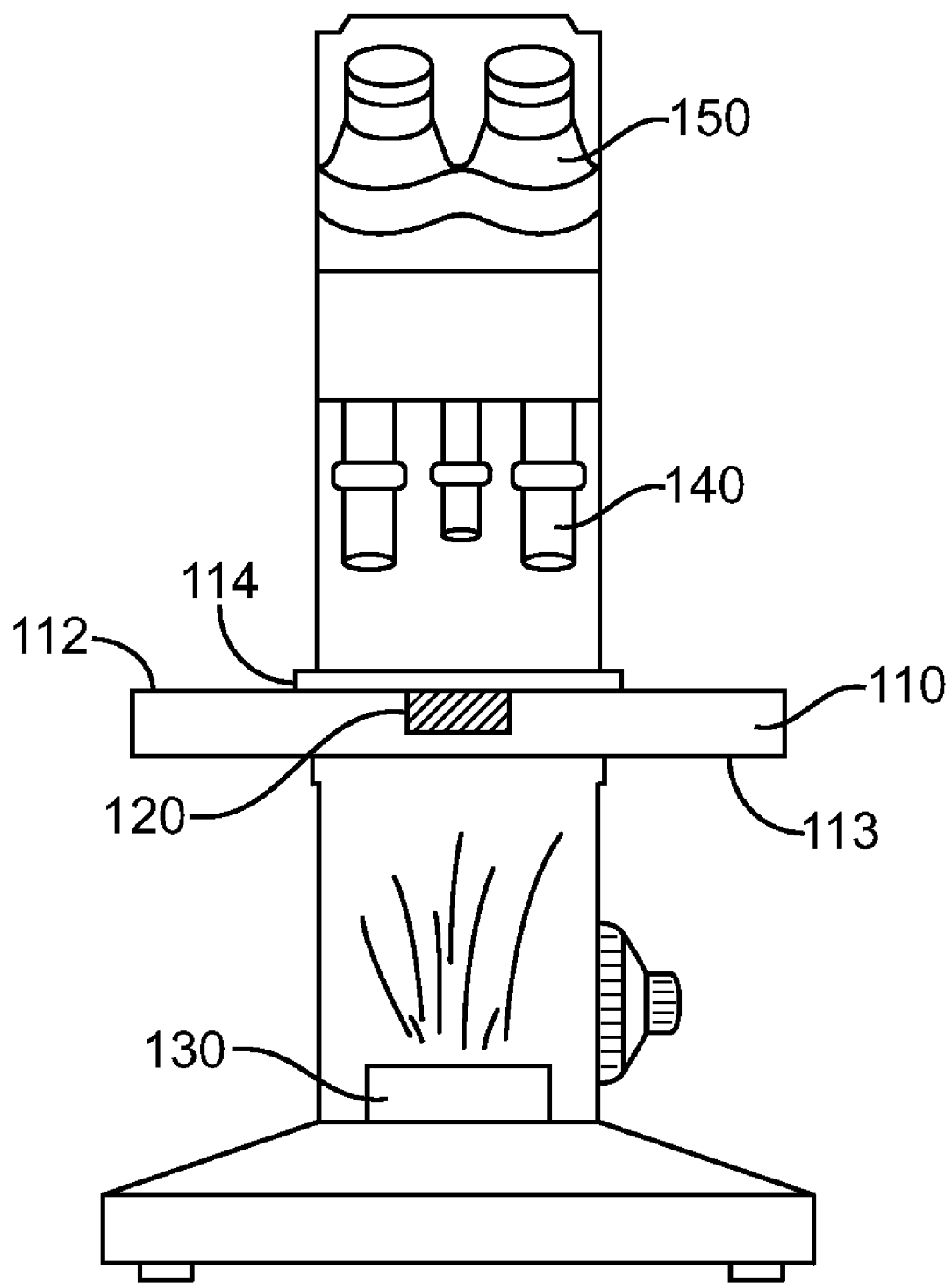
FIG. 2 is a front view of the microscope shown in FIG. 1.

FIGS. 1-2 generally illustrate a microscope 100 or other machine vision device (generally referred to as a "microscope" 100) having a stage 110 that includes a positional and optical calibration target or component 120 (generally referred to as "calibration component" 120) that is integral with the stage 110. By being "integral" with the stage 110, the calibration component 120 is integrated or embedded within the stage 110, formed or defined through the stage, formed or deposited on the stage 110, or attached to the stage 110. In other words, the calibration component 120 is integral with the stage 110 such that the calibration component 120 is affixed to, attached to, integrally associated with the stage 110, as opposed to independent calibration devices such as known specialized calibration slides that may be used to calibrate different microscopes. For ease of explanation, reference is made to a calibration component 120 that is integral with the stage 110.

The stage 110 has a top surface 112 for supporting a specimen slide 114, and a light source 130 is positioned to illuminate the specimen on the specimen slide 114. Suitable light sources 130 include a tungsten-halogen light source, a Light Emitted Diode (LED), or other suitable light source. Light emitted by the light source 130 directly or indirectly illuminates the calibration component 120, e.g., by use of light emitted through one or more apertures, channels or spaces extending through an underside 113 of the stage 110.

The microscope 100 may also include a controller (not shown for clarity), which may be used to adjust the position of the stage 110 and to adjust optical or light parameters such as the balance and intensity of light emitted by the light source 130. The microscope 100 further includes plurality of objective lenses 140 for magnifying light received from the specimen to form a magnified image of the specimen, and an ocular lens 150 that is used to observe the magnified image formed by the objective lens 140. Further aspects of suitable microscope 100 components are provided in U.S. Publication No. 2007/0139638 A1, the contents of which are incorporated herein by reference. It should be understood that the microscope 100 shown in FIGS. 1 and 2 is provided as one example of a microscope 100 that may be used with embodiments, and that other suitable microscopes 100 may include other known components that are not illustrated for clarity and ease of explanation.

Figure 3:
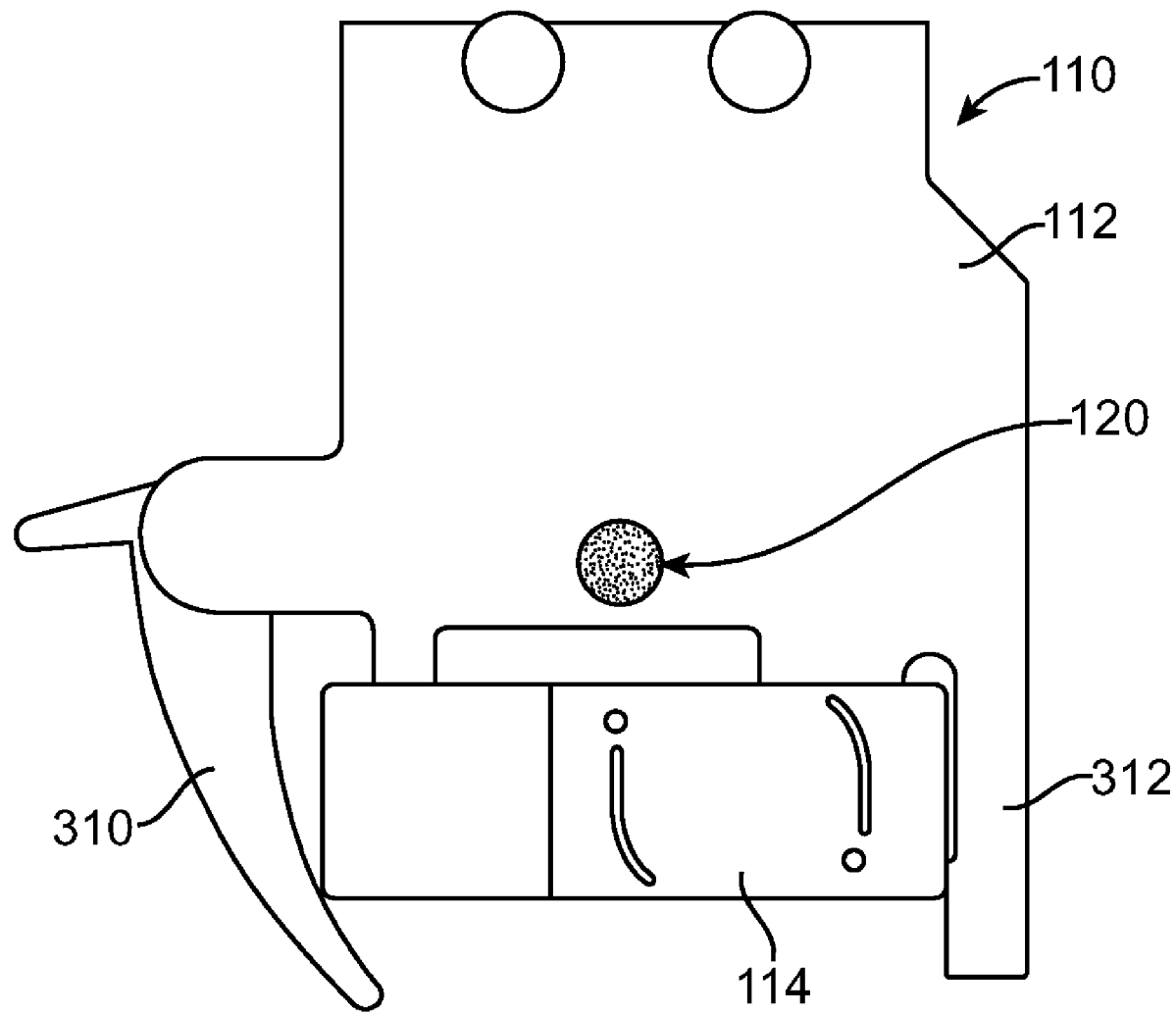
FIG. 3 is a top view of a stage constructed according to one embodiment that includes a calibration component.

Referring to FIG. 3, a stage 110 constructed according to one embodiment includes an integral calibration target 120 and may, for example, including a rotatable or pivotable support arm 310, e.g., a spring-loaded support arm, for holding the slide 114 in place on the top surface 112 of the stage 110 against a backing or other support member 312. Calibration components 120 can be integrated with stages 110 having other configurations.

In the illustrated embodiment, the calibration component 120 is integral with the stage 110 adjacent to the slide 114; however, the calibration component 120 may be in different locations in other embodiments depending on, for example, the configuration of the stage 110, the position of the slide 114 on the stage 110, and the arrangement and number of optical components of the microscope 100. Thus, the configuration shown in FIG. 3 is provided as one example of how embodiments may be implemented.

In the embodiment shown in FIG. 3, a single calibration component 120 is provided for performing both positional calibration and optical calibration of the microscope 100 without the need for a specialized calibration slide. For example, the calibration component 120 may be configured for measuring or determining positional calibration parameters including one or more of a "x" position of the stage 110, a "y" position of the stage 110, a "z" position of the stage 110, camera-to-stage alignment (e.g., when the microscope 100 is used for imaging purposes), changes in one or both of "x" and "y" positions of the stage 110 during slide 114 imaging and/or review and changes in "z" position of the stage 110 during imaging and/or review. The calibration component 120 may also be used to measure or determine optical calibration parameters of the microscope 100 including, for example, one or more of grey scale linearity, magnification, signal-to-noise ratio, changes in illumination before and after slide 114 imaging, Modulation Transfer Function (MTF) and checking for stuck pixels or elements of a charge coupled device (CCD) of the microscope 100 that output a constant value regardless of the amount of light to which they are exposed. Further details regarding tests and measurements involving MTF are provided in "How to Measure MTF and other Properties of Lenses," Optikos Corporation, Cambridge, Mass., pp. 1-64 (Jul. 19, 1999), the contents of which are incorporated herein by reference. It should also be understood that the calibration component 120 may be used for performing various positional and optical calibration procedures, and the positional and optical calibration parameters provided above are examples of how embodiments may be implemented.

For example, the calibration component 120 may also be configured for performing other types of positional calibration, e.g., angular or rotational calibration (θ) of the microscope stage 110. For this purpose, two calibration components 120 that are separated from each other may be utilized to measure stage 110 rotation. For ease of explanation, reference is made to (x,y,z) positions. Further, referring to FIG. 4, in an alternative embodiment, a first calibration component 120a integral with the stage 110 for performing positional calibration of the microscope 100 and a second calibration component 120b integral with the stage 110 for performing optical calibration of the microscope 100.

Figure 4:
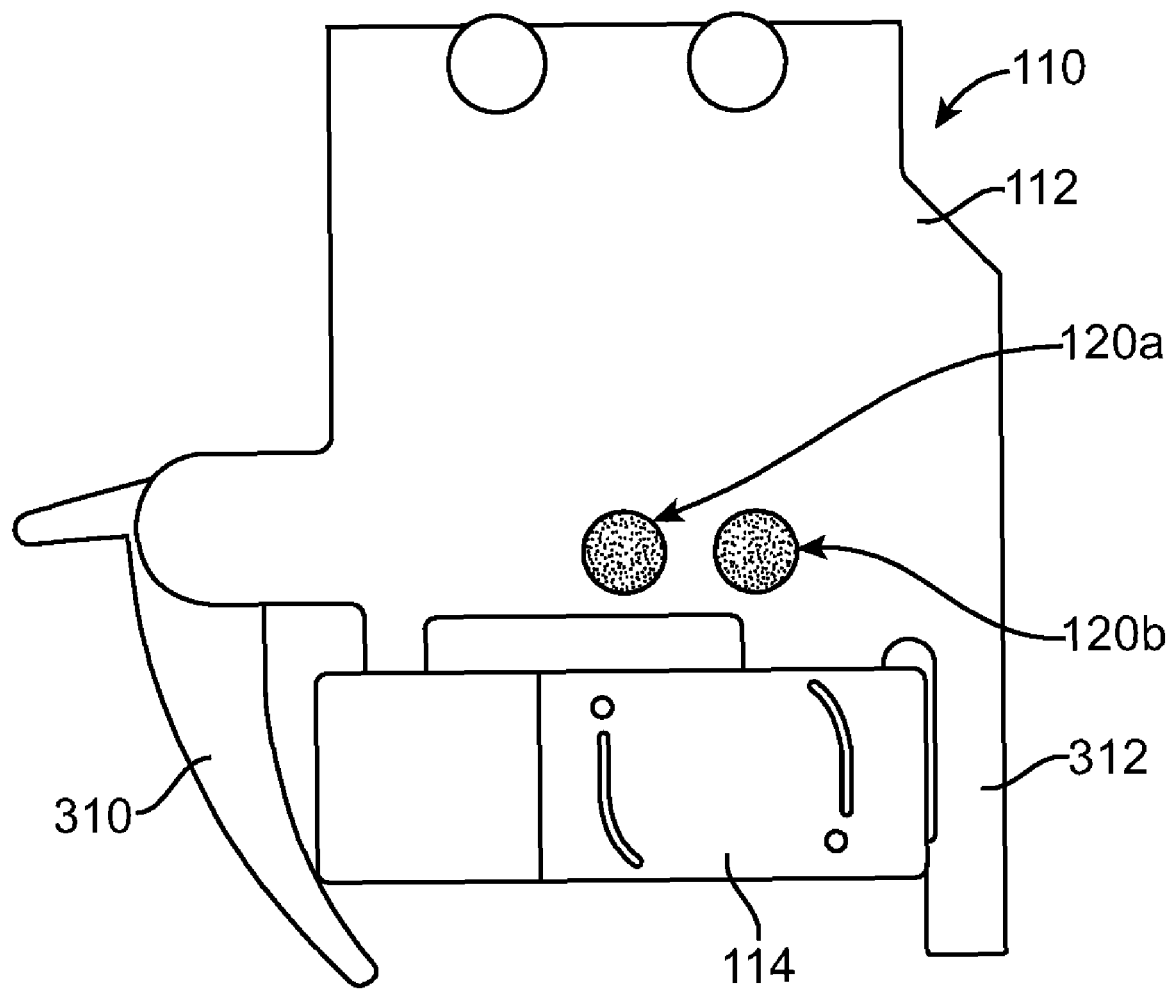
FIG. 4 is a top view of a stage constructed according to another embodiment that includes calibration components.

Thus, embodiments may be implemented with a single calibration component 120 (as shown in FIG. 3) that can be used for both positional calibration and optical calibration, or with multiple integral calibration components 120a, 120b (as shown in FIG. 4) for performing different types of calibration, while eliminating the need for specialized calibration slides. For ease of explanation, reference is made to the configuration shown in FIG. 3 in which a stage 110 includes a single integral calibration component 120 that may be used for performing both positional calibration and optical calibration of the microscope 100.

Figure 5:
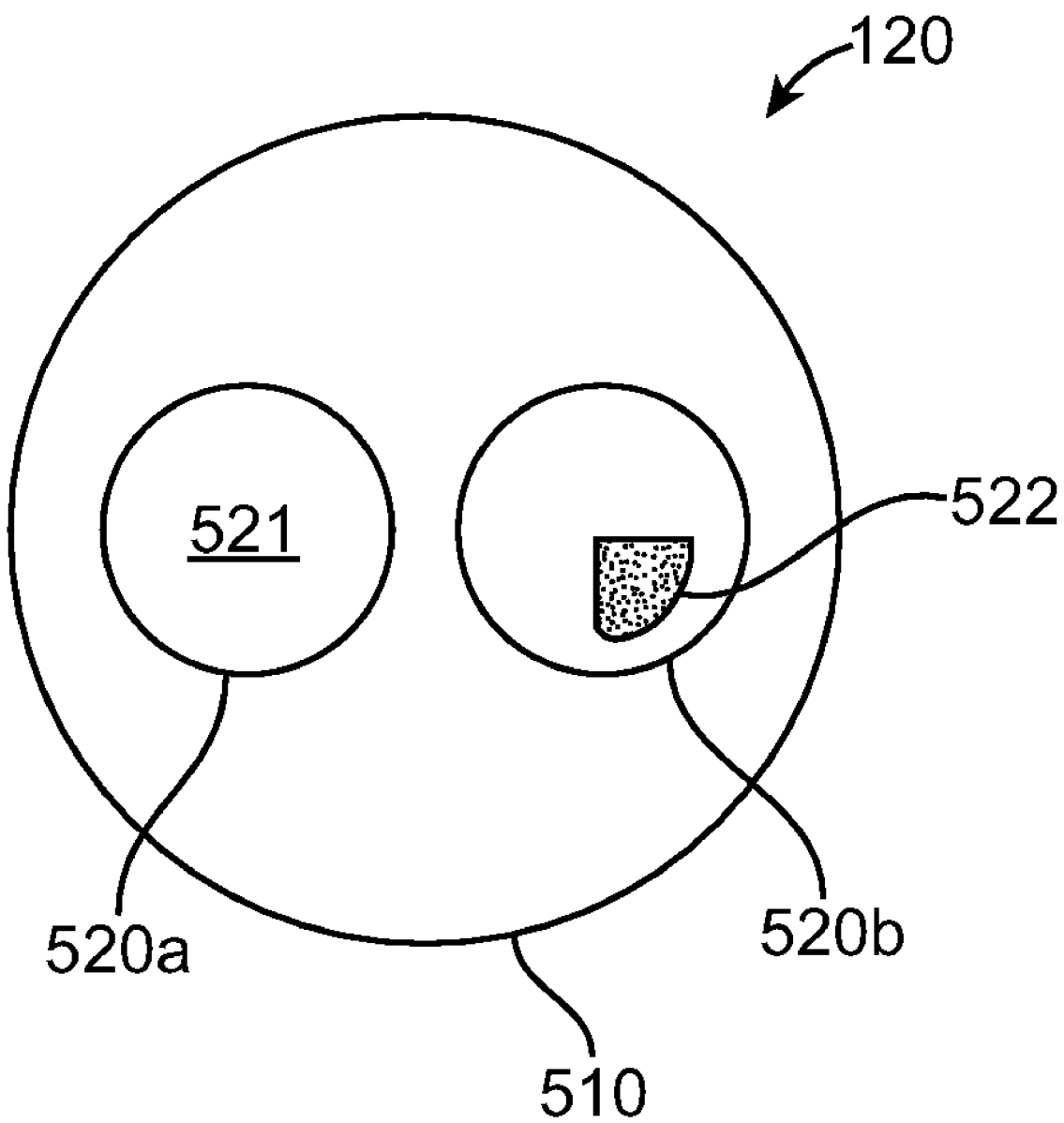
FIG. 5 shows a calibration component constructed according to one embodiment that includes calibration elements configured for performing positional calibration and optical calibration.

Referring to FIG. 5, a calibration component 120 constructed according to one embodiment for use in performing both positional calibration and optical calibration of a microscope 100 is defined by an outer boundary 510 and includes at least two calibration elements that define at least two fields of view or printed graphic boundaries (generally referred to as a field of view 520). A graphic, datum or fiducial mark 522 (generally referred to as a fiducial mark 522) may be within a field of view 520.

In the illustrated embodiment, the outer boundary 510 and the fields of view 520 are the same shape, and the two fields of view 520 are the same shape and size. In one embodiment, the diameter of the calibration component 120 as defined by the outer boundary 510 may be about 6.4 mm, and the diameter of each field of view 520 may be about 2.2 mm. These dimensions are suitable for use with a microscope 100 having a 10× objective lens 140. Other boundary 510 and field of view 520 shapes and sizes may be utilized, and fields of view 520 may have different shapes and/or sizes as necessary, e.g., with different microscope 100 configurations or when different objective lenses 140 are utilized. Further, although the fields of view 520 shown in FIG. 5 are arranged horizontally side-by-side, the fields of view 520 may also be arranged in different manners, e.g., in a vertically or at an angle relative to a horizontal or vertical line.

FIG. 5 illustrates one embodiment of a calibration component 120 that includes calibration elements 520a, 520b that define two fields of view—a first field of view for performing optical calibration and a second field of view for performing positional calibration. In the illustrated embodiment, the first field of view 520a is clear 521 and is used for performing optical calibration. Optical calibration may involve, for example, measuring the evenness or uniformity of illumination and detecting artifacts such as dust and smudges that degrade signal-to-noise ratios. In the illustrated embodiment, the second field of view 520b includes a datum or fiducial mark 522, which may be used as a reference datum or for measurement or positional calibration purposes. In other embodiments, the calibration component 120 may include different numbers of fields of view 520 and other graphics and marks for different calibration functions. Accordingly, FIG. 5 is provided as one example of how embodiments can be implemented.

Figure 6:
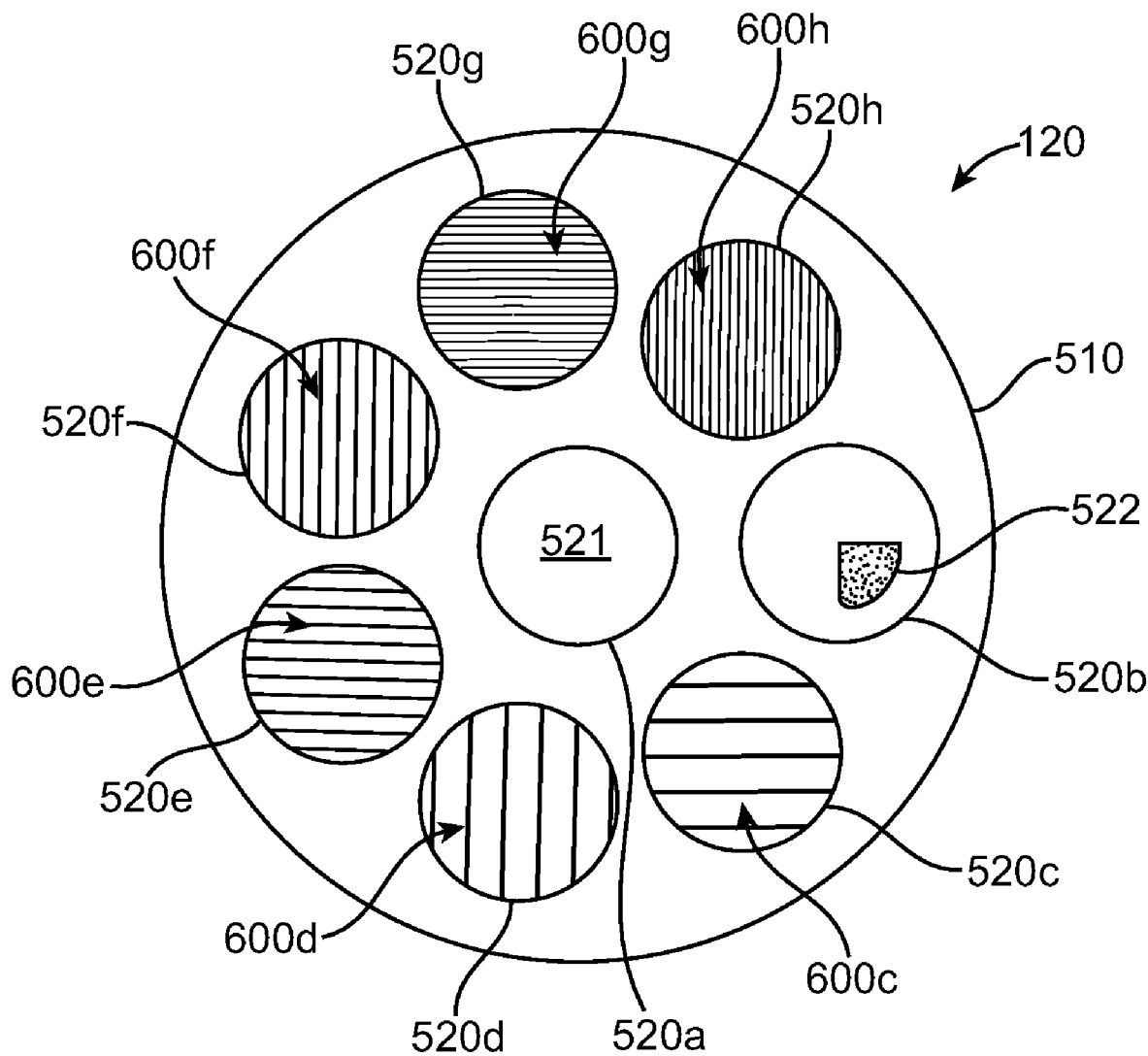
FIG. 6 shows a calibration component constructed according to an alternative embodiment that includes calibration elements configured for performing positional calibration and optical calibration.

For example, FIG. 6 illustrates a calibration component 120 constructed according to another embodiment that may be utilized for performing both positional calibration and optical calibration. In the illustrated embodiment, the calibration component 120 includes an outer boundary 510 that surrounds eight discrete calibration elements that define eight respective fields of view 520a-h. In the illustrated embodiment, seven calibration elements that define seven respective fields of view 520b-h are arranged around the central calibration element that defines a central field of view 520a which, in the illustrated embodiment, is clear 521 and may be used to perform optical calibration. In one embodiment, as illustrated, seven calibration elements defining seven respective fields of view 520b-h are arranged around the central field of view 520 in a circular and evenly spaced manner. In one embodiment, the outer boundary 510 that defines the calibration component 120 may have a diameter of about 10 mm, and each field of view 520 may have a diameter of about 2.2 mm. Thus, as shown in FIGS. 5 and 6, the dimensions of the calibration component 120 may vary depending on the calibration elements that are utilized. Other embodiments may involve different numbers, arrangements, sizes and spacing of calibration elements.

In the illustrated embodiment, calibration elements defining fields of view 520c-h are configured for performing optical calibration, e.g., using a modulation transfer function (MTF) pattern, and a calibration element defines a field of view 520b that includes a fiducial mark 522 for use in performing positional calibration. For example, the fields of view 520c-h defined by respective calibration elements may include different MTF patterns, which may be horizontal and/or vertical MTF patterns. As shown in FIG. 6, the fields of view 520c,e,g include horizontal modulation transfer function (MTF) patterns 600c,e,g (generally referred to as MTF pattern 600), and the fields of view 520d,f,h include vertical MTF patterns 600d,f,h. Further, in another embodiment, the calibration component 120 may include calibration elements may have MTF patterns 600e,f of different sizes. For example, two calibration elements may define fields of view 520g,h including respective MTF patterns 600g,h having 2-micron spacing, whereas two other calibration elements may define fields of view 520e,f including respective MTF patterns 600e,f having 3-micron spacing, and other calibration elements may define fields of view 520c,d including MTF patterns 600c,d having 4-micron spacing.

It should be understood that other types of optical calibration elements and arrangements and dimensions thereof may be utilized. For example, the central calibration element may define a field of view 520a that includes a fiducial mark 522 for positional calibration rather than being a clear 521 field of view. Further, different types, numbers and arrangements of MTF patterns 600 may be utilized.

Figure 8:
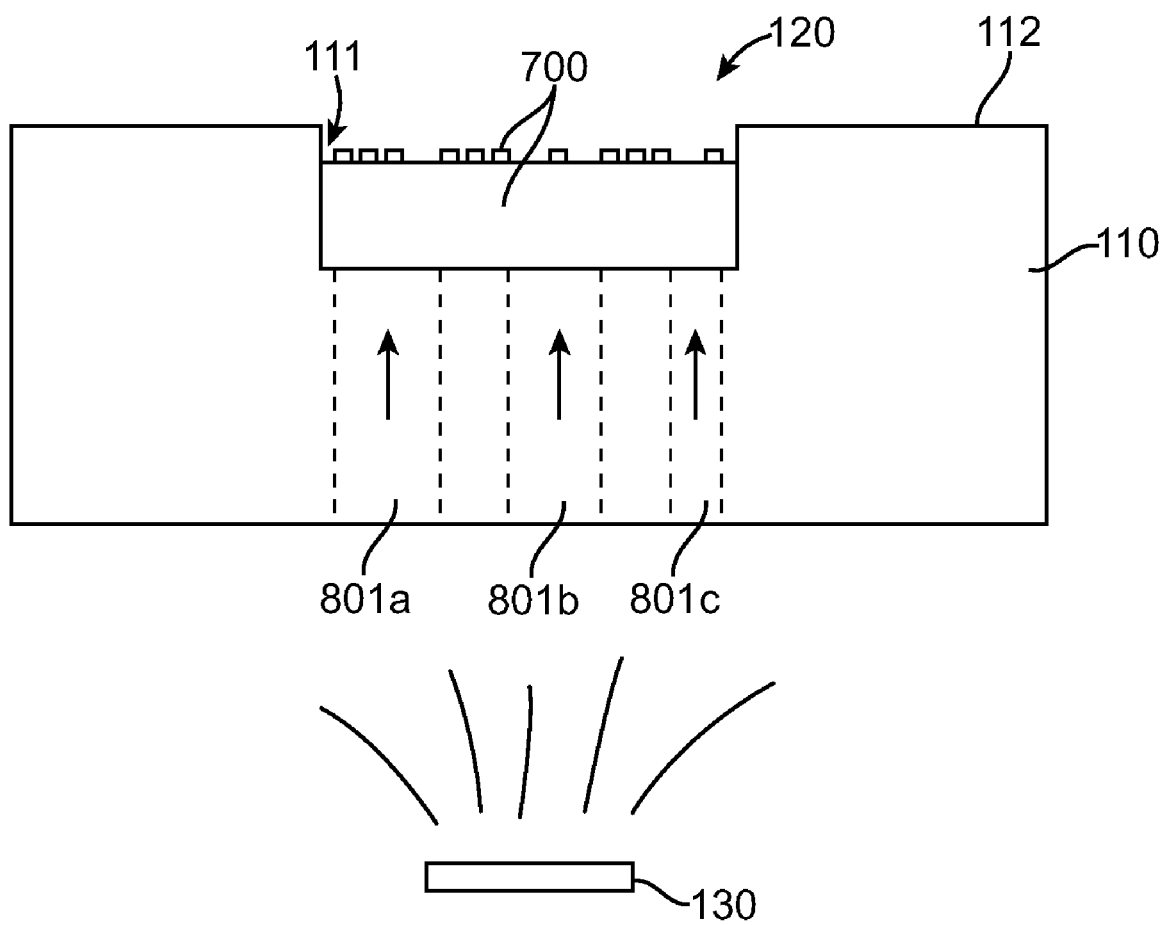
FIG. 8 is a cross-sectional view of a microscope stage constructed according to one embodiment that includes a calibration component as shown in FIG. 7 positioned within a cavity formed within the stage and illuminated from an underside of the stage.

Additionally, although FIG. 8 illustrates a calibration component 120 including seven calibration elements defining respective fields of view 520a and 520c-h for performing optical calibration and one field of view 520b having a fiducial mark 522 for performing positional calibration, the calibration component 120 may also include multiple fields of view for performing positional calibration. Thus, the configurations shown in FIGS. 5 and 6 are provided as illustrative examples of how embodiments may be implemented.

Figure 7:
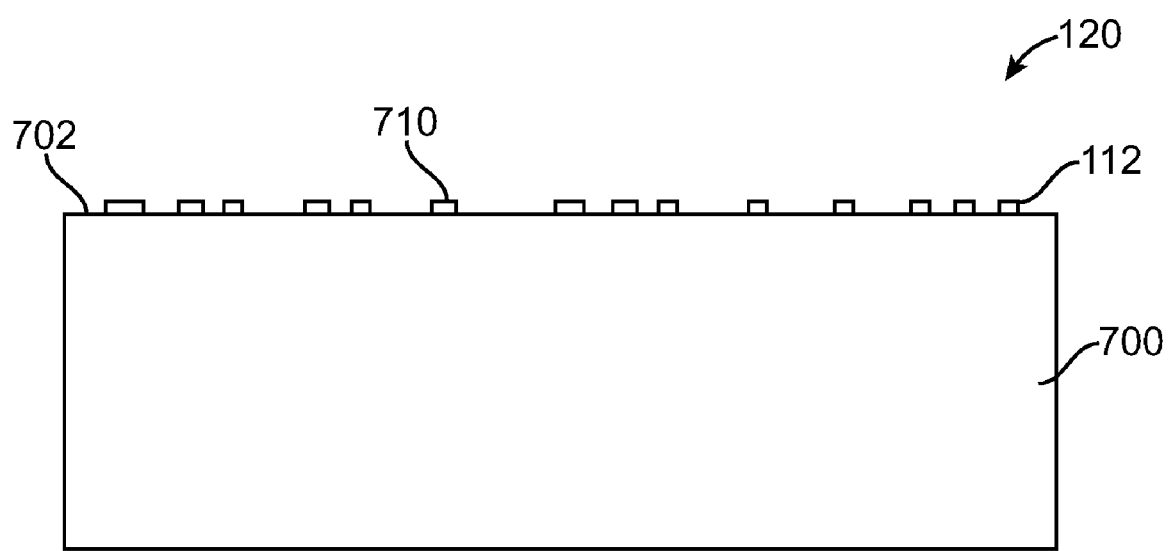
FIG. 7 is a side view of a calibration component constructed according to one embodiment having calibration elements formed or deposited on a top surface of a substrate

FIGS. 7-10 illustrates different manners of integrating a calibration component 120 with a stage 110 of a microscope 100 according to different embodiments. Referring to FIGS. 7 and 8, according to one embodiment, a calibration component 120 may be formed on a substrate 700, which is then integrated or embedded within a cavity or space 111 formed within the stage 110. In one embodiment, the substrate 700 is a glass substrate, e.g., a glass disc, and the calibration component 120 is formed on a top surface 702 of the substrate 700 by deposition of a material 710, such as chrome, on the top surface 702. This results in formation of a calibration component 120 that is configured for performing positional and optical calibration of a microscope 100. The substrate 700 having the deposited material 710 may be embedded or placed within the cavity 111 such that the calibration component 120 is integral with the stage 110.

As shown in FIG. 8, in one embodiment, one or more apertures 801a-c (generally 801) are formed through the stage 110 in order to illuminate the calibration component 120 utilizing a light source 130 positioned below the stage 110. Illumination of the calibration component 120 may be direct or indirect. The number, width and shape of the apertures 801 may vary as necessary. Thus, the apertures 801 shown in FIG. 8 are provided to generally illustrate that the calibration component 120 integral with the stage 110 is illuminated.

Figure 9:
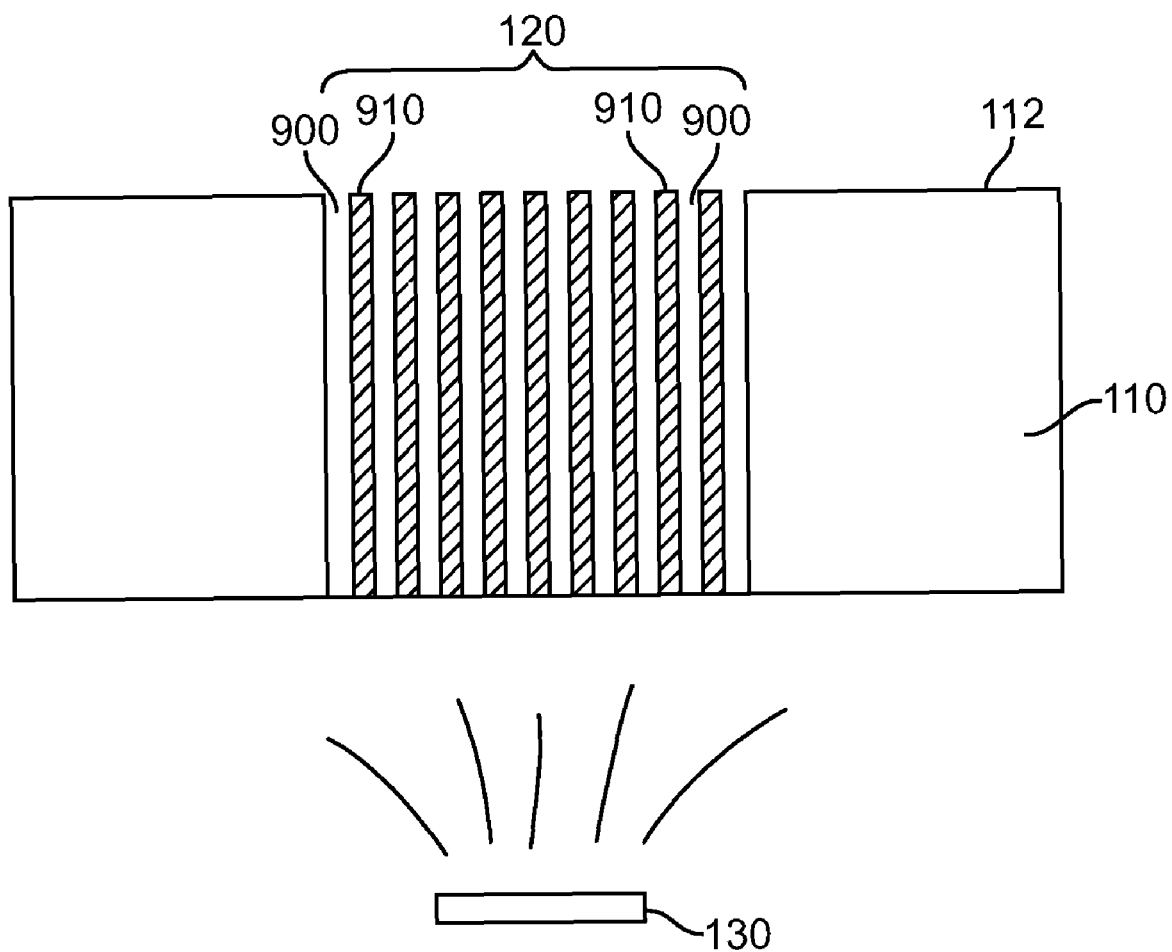
FIG. 9 is a cross-sectional view of a microscope stage constructed according to an alternative embodiment that includes a calibration component having a calibration element formed or etched completely through the stage.
Figure 10:
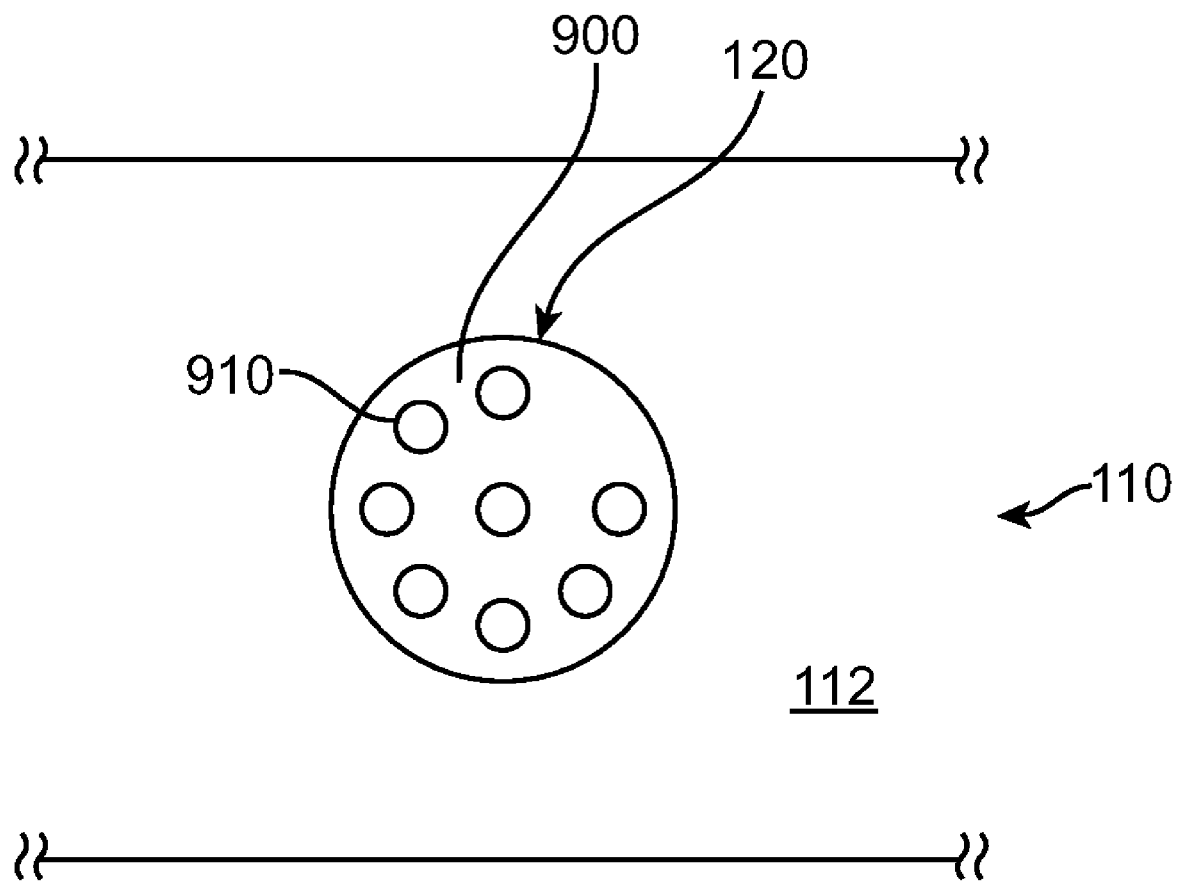
FIG. 10 is a top view of the calibration component shown in FIG. 9.

Referring to FIGS. 9 and 10, according to an alternative embodiment, the calibration component 120 may be an integral part of the stage 110 by forming the calibration component 120 into the stage 110 by etching or removing portions 900 of the stage 110. In this manner, one or more etched portions 900 and one or more remaining portions 910 define or form calibration elements of the calibration component 120. For example, a field of view 520 defined by one calibration element may have a fiducial mark 522 and may be defined by a portion 910 of the stage 110 that remains following etching, whereas a clear 521 field of view 520 defined by another calibration element may be defined by an open space 900 or aperture formed by etching. The stage 110 may be etched by various known techniques including, for example, known machining or milling systems and methods such as laser milling and photo chemical etching. Persons skilled in the art will appreciate that a calibration component 120 may be integral with the stage 110 in different manners, and that FIGS. 7-10 provide illustrative examples of how embodiments may be implemented. For example, in one embodiment, a calibration component 120 may also be attached or affixed to the stage 110, e.g. by an adhesive, such that the calibration component 120 is an integral part of the stage 110.

Figure 11:
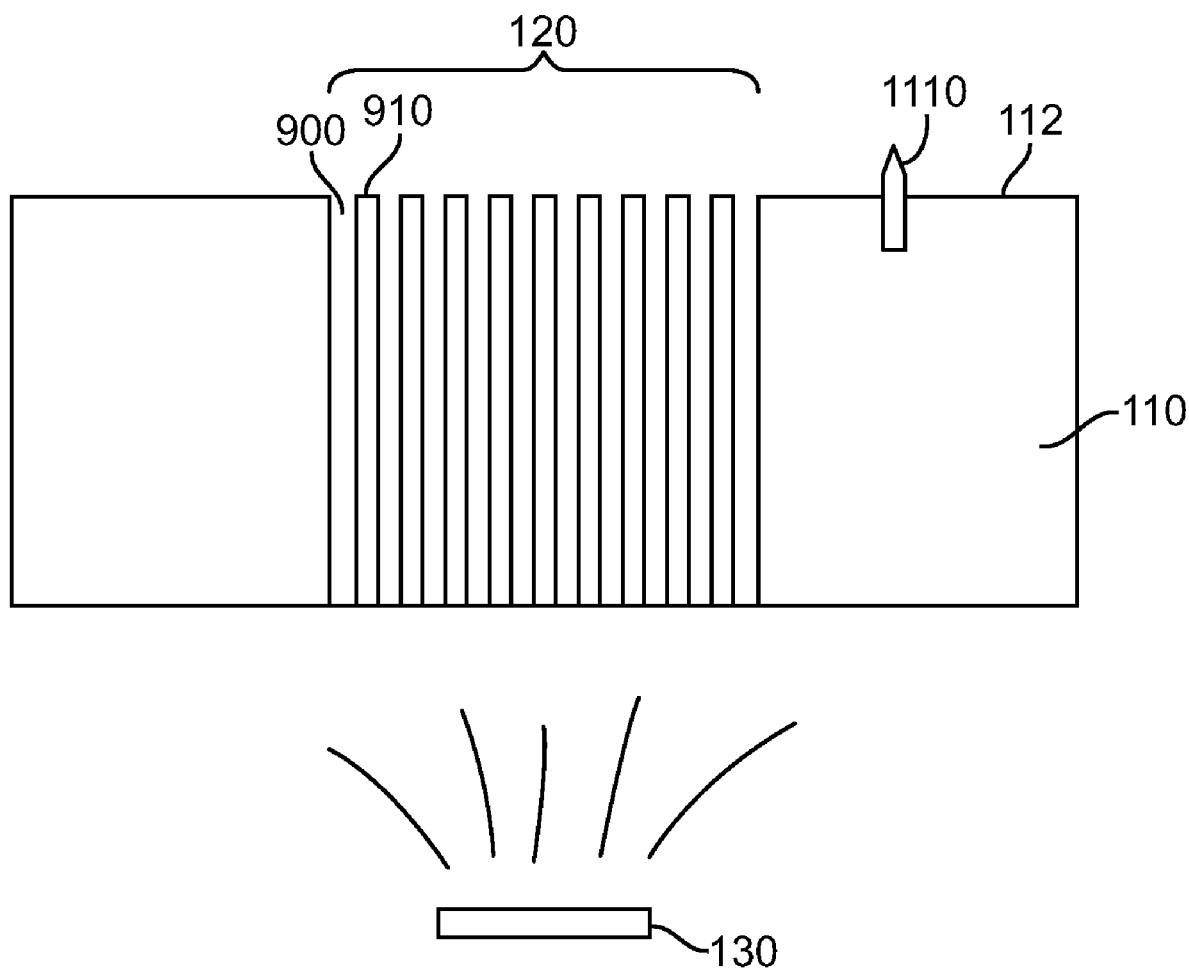
FIG. 11 is a cross-sectional view of a microscope stage constructed according to another embodiment including a calibration component as shown in FIG. 9 and an integrated or attached knife edge calibration component.

Referring to FIG. 11, in another embodiment, a calibration component can be a precision calibration component, such as a razor blade or similar device 1110, which is attached or affixed to, or integrated or embedded within the stage 110. In the illustrated embodiment, the calibration component 1110 is in the form of a sharp edge or "knife edge," and allows a vision system or microscope 100 to perform measurements involving the razor blade 1110 to derive meaningful optical or positional calibration data, e.g., based on Foucault knife-edge tests.

In one embodiment, the stage 110 includes a single integral calibration component in the form of a razor blade or knife edge 1110. In another embodiment, the stage 110 includes a calibration component 120 (e.g., as described with reference to FIGS. 1-10) and a calibration component in the form of a razor blade or knife edge 1110. Various combinations of integral calibration components 120, 1110 may be utilized as necessary depending on, for example, calibration needs and capabilities and system configurations.

Figure 12:
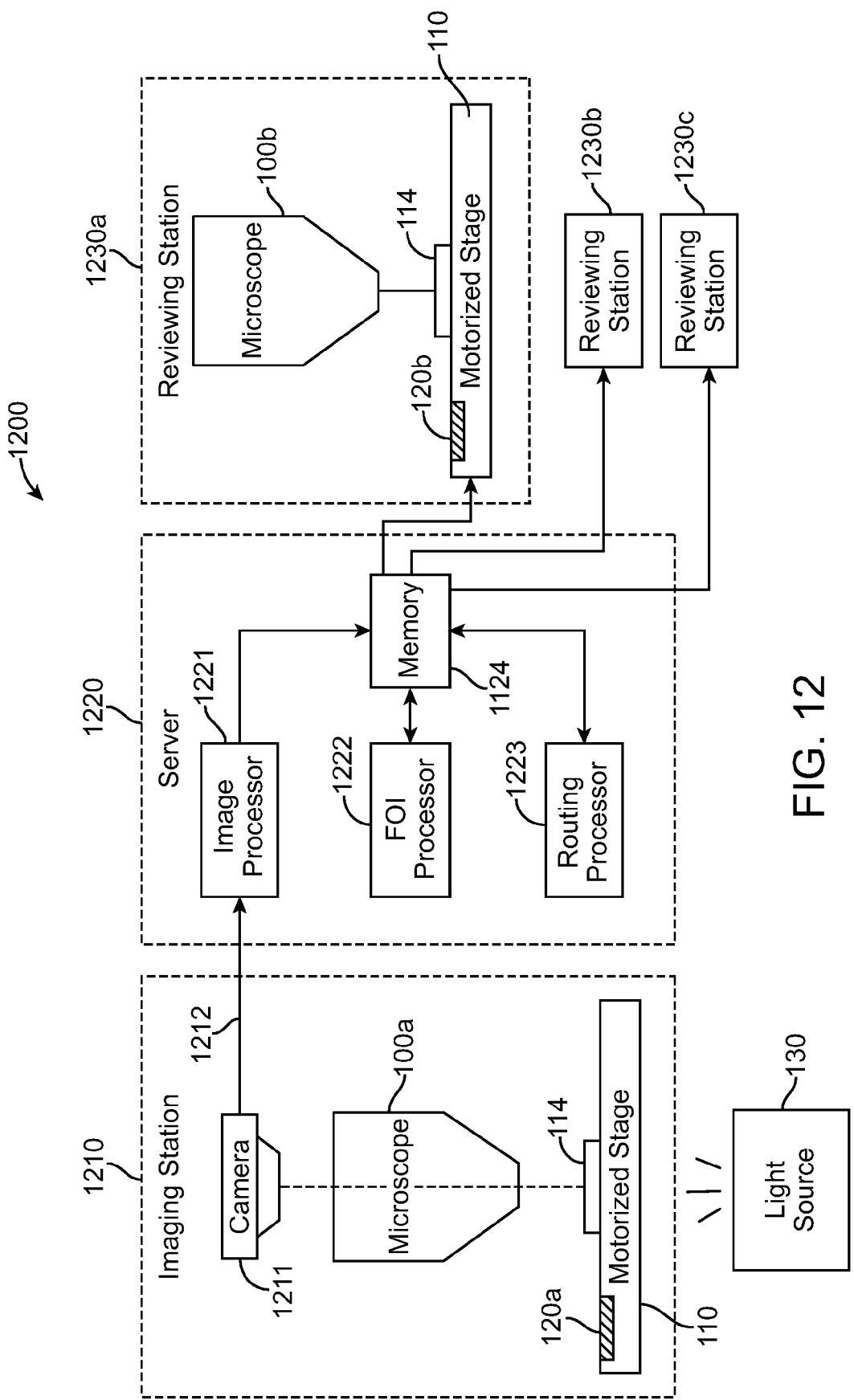
FIG. 12 illustrates an imaging and review system that includes separate imaging and review components in which embodiments may be implemented.
Figure 13:
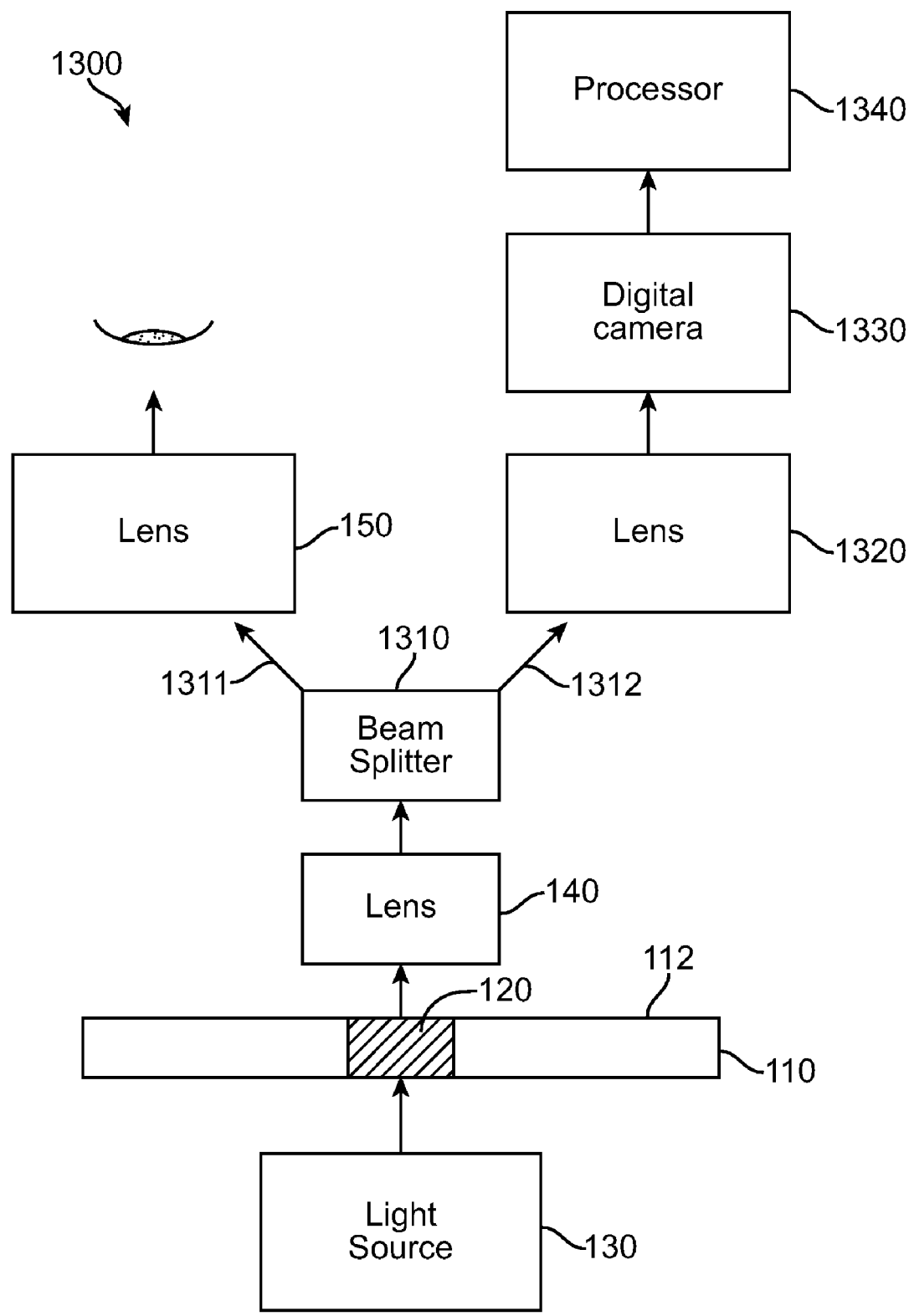
FIG. 13 illustrates an integrated system in which the same microscope is used for specimen imaging and review and in which embodiments may be implemented.
Figure 14:
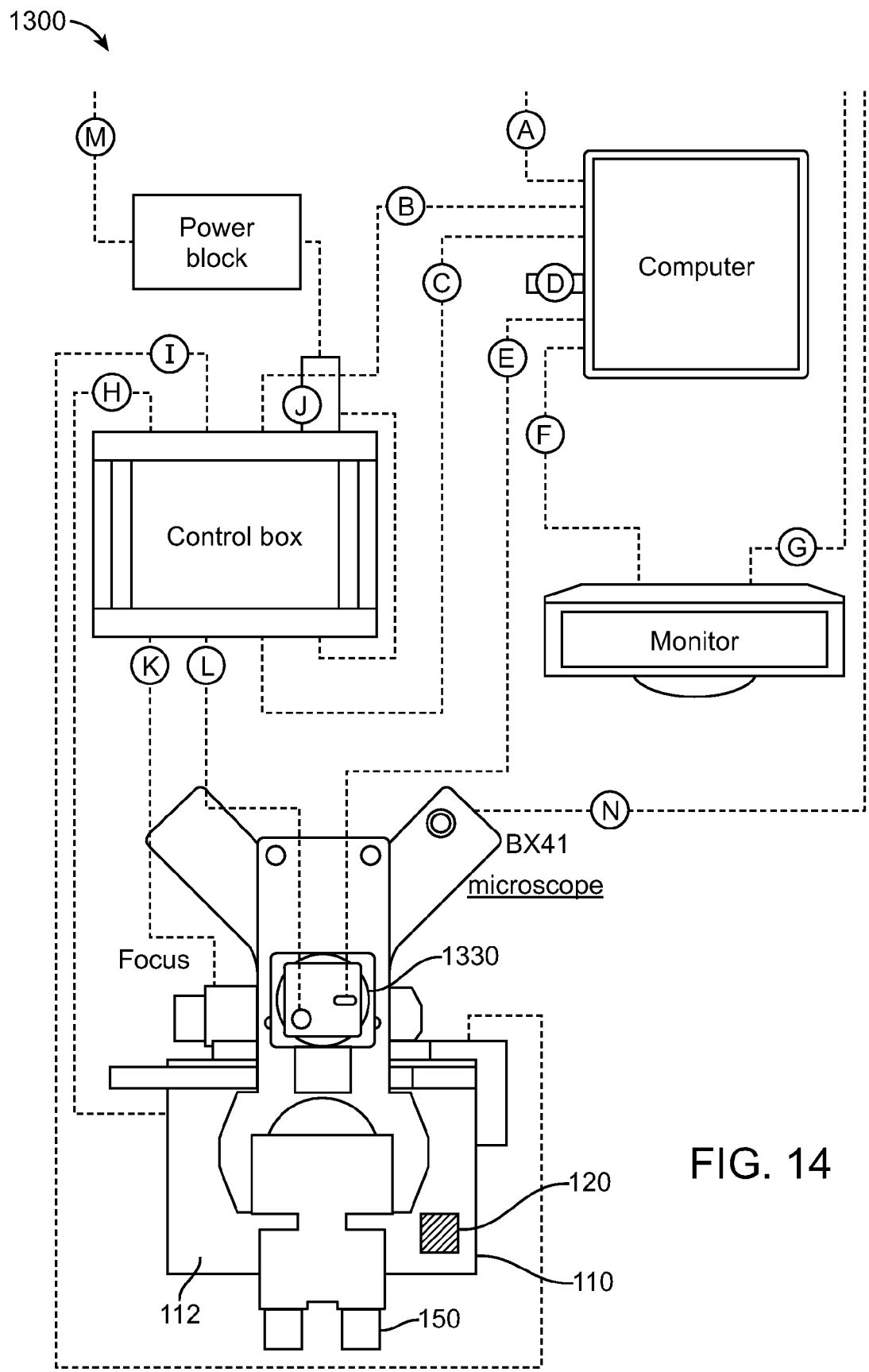
FIG. 14 further illustrates an integrated system in which the same microscope is used for specimen imaging and review and in which embodiments may be implemented.

Embodiments having a stage 110 with one or more integral calibration components may be used in various machine vision applications, one of which is a microscope 100 (as generally shown in FIGS. 1 and 2) for examination of cytological specimens carried by slides 114. Examples of cytological processing systems that may utilize a microscope stage having an integral calibration component are shown in FIGS. 12-14. Although cytological processing systems can be utilized with different types of calibration components, e.g., the calibration components 120 shown in FIGS. 1-10 and/or the knife-edge calibration component 1110 shown in FIG. 11, reference is made to calibration components 120 generally for ease of explanation.

FIG. 12 illustrates a biological screening system 1200 including an imaging station 1210, a server 1220 and one or more reviewing stations 1230a-c. The system 1200 is configured for imaging a biological specimen carried by a slide 114 using a camera 1211, a first microscope 100a, a first stage 110a and a first calibration component 120a integral with the first stage 110a. The position of the first calibration component 120a may vary as necessary, and FIG. 12 generally illustrates that a first stage 110a includes a first calibration component 120a.

The resulting image data 1212 is processed by the server 1220, which includes suitable hardware and software, e.g., processors 1221-1223 and memory 1224, in order to select and store locations of identified objects of interest (OOIs) of the imaged biological specimen. The OOIs may then be presented to a cytotechnologist, who can review OOIs using the second microscope 110b having a second calibration component 120b of the review station 1230a, or another microscope 100 at another review station 1230b,c. The position of the second calibration component 120b may vary as necessary, and FIG. 12 generally illustrates that a second stage 110b includes a second calibration component 120b.

Thus, the system 1200 shown in FIG. 12 includes two microscopes—a first microscope 100a in the imaging station 1210 and a second microscope 100b in the reviewing station 1230. Although the configuration of the microscopes 100a and 100b may differ, each microscope 100 may include a microscope stage 110 that includes an integral calibration component 120. Further aspects of a system 1200 of the type generally illustrated in FIG. 12 are provided in U.S. Publication No. 2004/0254738 A1, the contents of which are incorporated hereby by reference.

FIG. 13 generally illustrates an integrated imaging/review microscope station or system 1300 that includes a stage 110 having an integral calibration component 120 as described above with reference to FIGS. 1-11. FIG. 14 illustrates in further detail one manner in which an integrated imaging/review station or system 1300 may be implemented.

With the system 1300 shown in FIGS. 13 and 14, the same microscope may be used for imaging and then for reviewing individual biological specimens, one slide 114 at a time. The system 1300 is configured such that light that passes from the light source 130, through the biological specimen, through an objective lens 140 and then to a beam splitter 1310. The beam splitter 1310 directs light in a first direction 1311 through an ocular lens 150 for review by a technician, and in a second direction 1312, through another lens 1320, to a digital camera 1330. The digital camera 1330 is operably coupled to a processor 1340, which processes images acquired by the digital camera 1330 in order to select OOIs for review by the cytotechnologist.

An integrated imager/review station 1300 may allow imaging and review of a specimen slide 114 by a user (e.g., as a desktop imaging/review system) one slide 114 at a time. Embodiments are particularly suited for use with the microscope stage 110 of these types of stations 1300 since they are operated by a user and, therefore, may require additional calibration procedures compared to known automated systems.

For example, embodiments can be utilized such that positional calibration and optical calibration procedures can be performed before each slide 114 is processed with an integrated imager/review station 1300 using the integrated calibration component 120. During use, whether with different microscopes 100a and 100b (as shown in FIG. 12) or with a single microscope 100 (as shown in FIGS. 13 and 14), positional calibration data (e.g., one or more of x, y and z position data) may be read or obtained from the calibration component 120 integral with a stage 110, and optical calibration data (e.g., light intensity, MTF, etc.) may also be read or obtained from the same calibration component (e.g., with the embodiment shown in FIG. 3). The microscope 100 may then be calibrated and adjusted as necessary based on the positional and optical calibration information. For this purpose, the position of the calibration component 120 utilized in an integrated imaging/review system 1300 may vary as necessary, and FIG. 13 generally illustrates that a stage 110 includes a calibration component 120. The microscope 100 may then be utilized for imaging and/or review of a specimen, and calibrated again using the same integral calibration component(s) 120.

As will be understood from the description above, embodiments advantageously allow a microscope 100, whether used only for review or also for imaging, to be calibrated when necessary without the need for specialized calibration slides. Further, calibration may be performed with a calibration component 120 that is always available since the calibration component 120 is an integral part of a stage 110. This provides improved calibration repeatability and productivity since it is not necessary to place a specialized calibration slide on a stage 110 and remove the specialized slide from the stage 110 manually or with a robot.

Although particular embodiments have been shown and described, it should be understood that the above discussion is not intended to limit the scope of these embodiments. Various changes and modifications may be made without departing from the spirit and scope of embodiments. For example, a calibration component may be used with various positional and optical calibration parameters. Calibration components can have various numbers and arrangements of positional and optical fields of view. Further, calibration components may be integrated with or embedded within a stage in various ways. Embodiments may also be implemented in various imaging and microscope components and other machine vision systems. Thus, embodiments are intended to cover alternatives, modifications, and equivalents that fall within the scope of the claims.

What is claimed is:

1. A stage for supporting a specimen slide, comprising:
a base having a bottom surface and a top surface, the top surface being configured for supporting the specimen slide; and
a calibration component integral with the base such that the calibration component is attached directly to or defined by the base and not removable from the base, the calibration component including a first calibration element configured for performing positional calibration of a microscope and a second calibration element configured for performing optical calibration of the microscope, the first and second calibration elements being configured for performing respective positional and optical calibrations without use of an independent calibration device that is moveable relative to or separable from the base.

2. The stage of claim 1, the base defining a cavity, wherein the calibration component is positioned within the cavity and attached to an interior portion of the base.

3. The stage of claim 1, wherein a portion of the calibration component is glass.

4. The stage of claim 1, wherein the calibration component includes at least one calibration element that is defined by the base by being formed or etched through the base.

5. The stage of claim 1, the first calibration element defining a first field of view that includes a fiducial mark, and the second calibration element defining a second field of view that is clear and different than the first field of view.

6. The stage of claim 5, the calibration component comprising:
a central calibration element defining a central field of view, and
a plurality of calibration elements defining respective fields of view arranged around the central field of view.

7. The stage of claim 6, wherein the central field of view is clear, the central calibration element being configured for performing optical calibration, and wherein at least one other calibration element defines a field of view that includes a fiducial mark, the at least one other calibration element being configured for performing positional calibration.

8. The stage of claim 1, wherein the second calibration element is configured for performing optical calibration based on an intensity of light, a uniformity of light or a modular transfer function.

9. A stage for supporting a specimen slide, comprising:
a base having a bottom surface and a top surface, the base being configured for supporting a single slide on the top surface; and
a calibration component integral with the base such that the calibration component is attached directly to or defined by the base and not removable from the base, the calibration component including a first calibration element defining a first discrete field of view and being configured for performing positional calibration and a second calibration element defining a second discrete field of view different than the first discrete field of view and being configured for performing optical calibration, the first and second calibration elements being configured for performing respective positional and optical calibrations without use of an independent calibration device that is moveable relative to or separable from the base.

10. The stage of claim 9, wherein the calibration component includes at least one calibration element that is defined by the base by being formed or etched through the base.

11. The stage of claim 9, wherein the first field of view includes a fiducial mark, and the second field of view is clear.

12. The stage of claim 9, the calibration component comprising:
a central calibration element defining a central field of view, and
a plurality of calibration elements defining respective fields of view arranged around the central field of view.

13. The stage of claim 12, wherein the central field of view is clear, the central calibration element being configured for performing optical calibration, and wherein at least one other calibration element defines a field of view that includes a fiducial mark, the at least one other calibration element being configured for performing positional calibration.

14. The stage of claim 13, wherein the second calibration element is configured for performing optical calibration based on an intensity of light, a uniformity of light, a magnification, or a modular transfer function.

15. A method of calibrating a microscope, comprising:
determining positional calibration information using a calibration component integral with a stage of the microscope such that the calibration component is attached directly to or defined by the base and not removable from the base;
determining optical calibration information using the calibration component; and
calibrating the microscope based on the positional calibration information and the optical calibration information determined using the calibration component, wherein positional calibration and optical calibration are performed without use of an independent calibration device that is moveable relative to or separable from the base.

16. The method of claim 15, wherein positional calibration information is determined from an element of the calibration component that defines a field of view including a fiducial mark.

17. The method of claim 15, wherein optical calibration information is determined from an element of the calibration component that defines a clear field of view.

18. An apparatus for performing positional and optical calibration of a microscope, comprising:
a calibration component integral with a stage of the microscope such that the calibration component is attached directly to or defined by the stage and not removable from the stage, the calibration component including a first calibration element configured for performing positional calibration of the microscope and a second calibration element configured for performing optical calibration of the microscope without use of an independent calibration device that is moveable relative to or separable from the base.

19. The apparatus of claim 18, wherein the calibration component includes at least one calibration element that is defined by the base by being formed or etched through the stage.

20. The apparatus of claim 18, wherein the first calibration element defines a first field of view including a fiducial mark, and the second calibration element defines a second field of view that is clear.

21. The stage of claim 18, the calibration component comprising:
a central calibration element defining a central field of view, and
a plurality of calibration elements defining respective fields of view arranged around the central field of view.

22. The stage of claim 21, wherein the central field of view is clear, the central calibration element being configured for performing optical calibration, and wherein at least one other calibration element defining a field of view that includes a fiducial mark, the at least one other calibration element being configured for performing positional calibration.

* * * * *